US007333232B2

(12) United States Patent
Hino et al.

(10) Patent No.: US 7,333,232 B2
(45) Date of Patent: Feb. 19, 2008

(54) IMAGE PROCESSING APPARATUS HAVING A FUNCTION TO RECEIVE CONTROL PROGRAMS TRANSFERRED FROM EXTERNAL DEVICE

(75) Inventors: Hideki Hino, Toyokawa (JP); Yoshihiko Yoshizaki, Toyokawa (JP); Kentaro Nagatani, Toyokawa (JP); Kazuo Okunishi, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 866 days.

(21) Appl. No.: 09/788,675

(22) Filed: Feb. 21, 2001

(65) Prior Publication Data

US 2001/0030767 A1 Oct. 18, 2001

(30) Foreign Application Priority Data

Apr. 14, 2000 (JP) ............................ 2000-112952

(51) Int. Cl.
*G06F 15/00* (2006.01)

(52) U.S. Cl. .................... 358/1.16; 358/1.15; 358/448; 711/100; 711/156

(58) Field of Classification Search ............... 358/1.16, 358/1.15, 448; 711/156
See application file for complete search history.

(56) References Cited

U.S. PATENT DOCUMENTS 4,677,310 A * 6/1987 Midorikawa et al. ......... 307/64
5,293,196 A * 3/1994 Kaneko et al. ............... 399/18
5,446,522 A * 8/1995 Tahara et al. .................. 399/8
5,588,012 A * 12/1996 Oizumi ....................... 714/805
5,917,610 A * 6/1999 Komada et al. ............ 358/400
6,094,698 A * 7/2000 Namikawa ................... 710/74
6,148,362 A * 11/2000 Sagi .......................... 711/102
6,191,699 B1 * 2/2001 Sawada ................ 340/815.45
6,571,311 B2 * 5/2003 Kuwano ..................... 711/103
6,621,994 B1 * 9/2003 Yamada et al. ............... 399/88

FOREIGN PATENT DOCUMENTS

JP 8-76654 3/1996
JP 10-213997 8/1998

OTHER PUBLICATIONS

English translation of Japanese Patent Laid-Open Application No. 10-213997, Aug. 11, 1998.*

* cited by examiner

*Primary Examiner*—Twyler Lamb
*Assistant Examiner*—Mark R. Milia
(74) *Attorney, Agent, or Firm*—Morrison & Foerster LLP

(57) ABSTRACT

An image processing apparatus avoids abnormal control on loads including an optional device and enables only program transfer when transfer of a control program from an external device is not normally proceeding. Through a communication interface, the control program is transferred from the external device to a flash memory via an external controller, while a transfer state thereof is stored in EEPROM. In response to the state of the EEPROM, CPU controls power supply to the external controller and the optional device to avoid abnormal operation of the optional device during transfer of control programs.

12 Claims, 5 Drawing Sheets

IMAGE PROCESSING APPARATUS HAVING A FUNCTION TO RECEIVE CONTROL PROGRAMS TRANSFERRED FROM EXTERNAL DEVICE

This application is based on Japanese Patent application No.2000-112952 filed in Japan, the contents of which are hereby incorporated by reference.

BACKGROUND OF THE INVENTION

The present invention relates to an image processing apparatus having a function to avoid malfunction during program write for program change or version upgrade.

Conventionally, there have been known such image processing apparatus as copying machines and printers that accept program rewrite for program change or version upgrade. One example is shown in Japanese Patent Laid-Open Publication No. 10-213997, where when program rewrite is performed by connecting an IC card-type external storage means to the device, power supply to loads for image forming (such as a fixing heater and a drive motor) is stopped to avoid malfunction. Another example is shown in Japanese Patent Laid-Open Publication No. 8-76654, where when downloading program in a memory, a master CPU notifies a slave CPU of the state of rewriting, and power supply to loads are controlled to be stopped by the slave CPU.

However, in the apparatus according to the above-stated Japanese Patent Laid-Open Publication No. 10-213997, power supply to loads is unconditionally stopped when the external storage means is connected, which may generate unnecessary loss time and thereby affect sufficiency of the apparatus. In the apparatus according to the above-stated Japanese Patent Laid-Open Publication No. 8-76654, necessity of two control devices (master CPU and slave CPU) complicates apparatus configuration, and absence of backup about whether or not program rewrite is under proceeding degrades operational reliability during program rewrite.

SUMMARY OF THE INVENTION

In view of solving the above-stated problems, one object of the present invention is to provide an image processing apparatus with high operational reliability which avoids abnormal control on loads including an optional device and enables only program transfer when transfer of a control program from an external device is not normally proceeding.

In order to achieve the above-mentioned object, according to one aspect of the present invention, an image processing apparatus, comprises: a first storage medium for storing a control program; a control device for controlling image processing of the image processing apparatus by the control program stored in the first storage medium; a transfer device for transferring the control program from an external device to the first storage medium; a nonvolatile second storage medium for storing a transfer state of the control program; an optional device; and a power supply control device for controlling power supply to the optional device in response to the transfer state stored in the second storage medium.

According to another aspect of the present invention, an image processing apparatus, comprises: a main body for forming images on paper sheets; an optional device; a first storage medium for storing a control program; a control device for controlling image processing of the image processing apparatus by the control program stored in the first storage medium, and forming images on the image forming device; a transfer device for transferring the control program from an external device to the first storage medium; a nonvolatile second storage medium for storing a transfer state of the control program; and a power supply control device for controlling power supply to the optional device in response to the transfer state stored in the second storage medium.

DETAILED DESCRIPTION OF THE PREFERRED EMBODIMENTS

Figure 1:
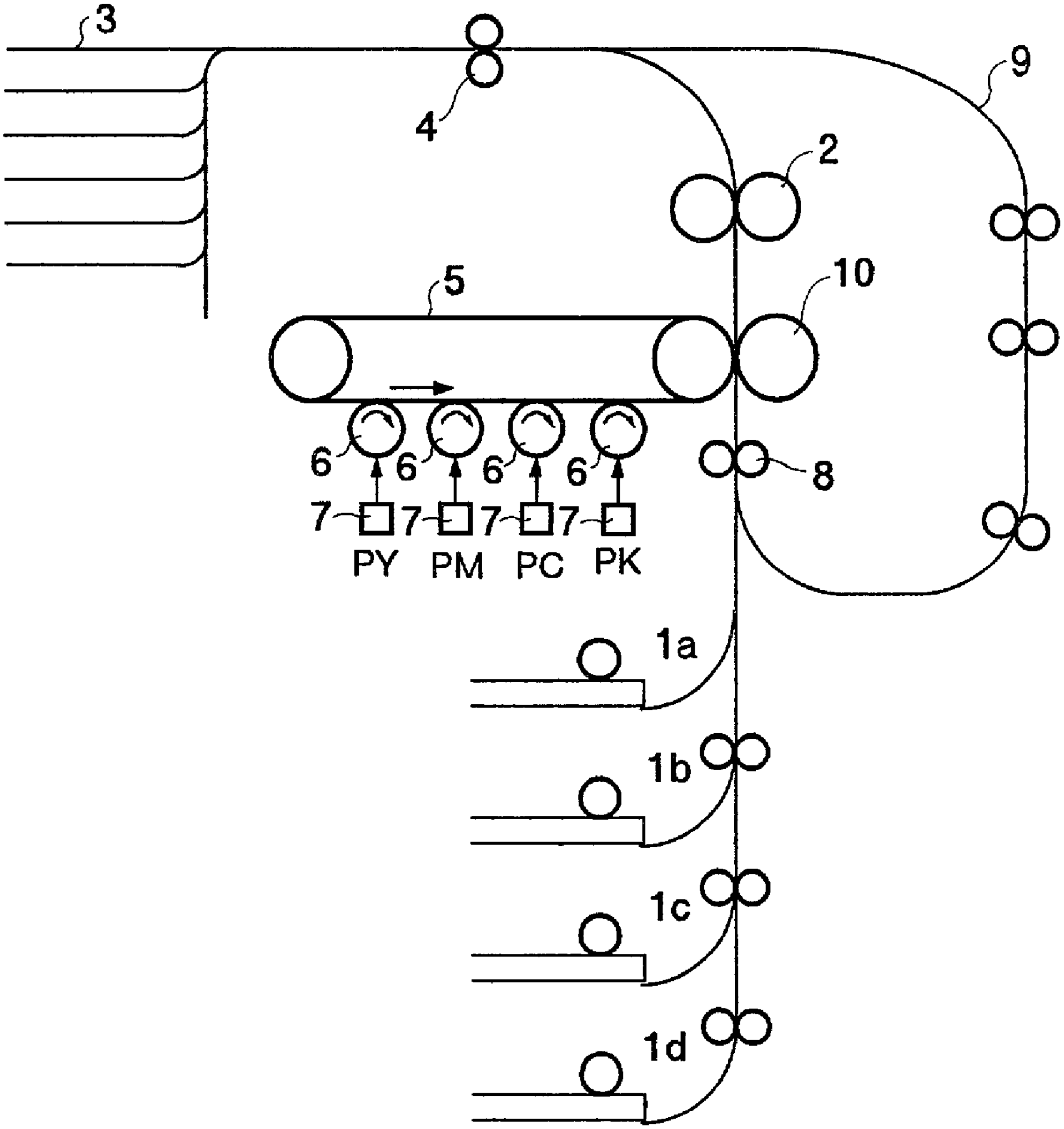
FIG. 1 is a view showing the configuration of the main image processing part in an image forming apparatus according to one embodiment of the present invention.

Hereinafter, an image processing apparatus according to one embodiment of the present invention is described in detail with reference to the accompanying drawings. FIG. 1 shows a main image forming part in an electrophotographic full-color image forming apparatus. The image forming apparatus is provided with image forming portions PY, PM, PC, and PK in four colors (yellow, magenta, cyan, and black). Underneath the image forming portions, there are disposed paper feed portions 1*a*, 1*b*, 1*c*, and 1*d*, and above the image forming portions, a fixing device 2 is disposed. On the left side of the fixing device 2, a sorter (male bin) 3 is disposed as an optional paper discharge device. The sorter 3 has a staple function and a shift tray function.

Between the fixing device 2 and the sorter 3, a paper inversion portion 4 is disposed for discharge of paper in an inverted state. The paper inversion portion 4 has a function to switch a route of paper to the sorter 3 for discharge or to an inversional rotation route 9 for the back side copy. On the left side of a transport line running from the paper feed portions 1*a* to 1*d* toward the fixing device 2, an endless transfer belt 5 is provided over a plurality of rollers in a known style. The transfer belt 5 is driven in the direction of an arrow, by which images formed in each of the image forming portions PC, PM, PY, and PK are transferred to the surface of the transfer belt 5 and images in 4 colors are overlaid. The overlaid images are transferred by a transfer roller 10 to paper sheets supplied through the paper feed portions 1*a* to 1*d*.

Each of the image forming portions PC, PM, PY, and PK are of substantially identical configuration and each equipped with a photoconductive drum 6 that is rotatably driven in the direction of an arrow shown in the figure and an image forming device disposed in the vicinity of the photoconductive drum 6. Although such image forming device can take arbitrary forms, there is disposed in this embodiment an image exposing device 7 for exposing images on the photoconductive drum 6, and in rotational direction of the photoconductive drum 6 there are disposed in order an electrification charger for equally electrifying the photoconductive drum 6, a developing machine for developing electrostatic latent images formed on the photoconductive drum 6, a transfer charger for transferring developed toner images to the transfer belt 5, and a cleaner for removing toner remained in the photoconductive drum 6.

There are accommodated a cyan toner in the developing machine of the image forming portion PC, magenta toner in the developing machine of the image forming portion PM, yellow toner in the developing machine of the image forming portion PY, and black toner in the developing machine of the image forming portion PK, respectively. The image exposing device 7 comprises LED array, where a beam modulated in response to a digital image signal upon reception thereof is scanned between the electrification charger and the developing machine in bus bar direction of the photoconductive drum 6 and exposed on the surface of the drum to form an electrostatic latent image on the photoconductive drum 6. Image signals corresponding to a cyan component in color images are input in the image exposing device 7 of the image forming portion PC, image signals corresponding to a magenta component in color images are input in the image exposing device 7 of the image forming portion PM, image signals corresponding to a yellow component in color images are input in the image exposing device 7 of the image forming portion PY, and image signals corresponding to a black component in color images are input in the image exposing device 7 of the image forming portion PK, respectively.

The transfer belt 5 is composed by connecting both sides of a film sheet, which is made of resin with semi-conductive or conductive characteristics, in an endless shape by such means as fusion. The transfer belt 5 is driven endlessly at a specified speed by a drive roller (not illustrated) in an arrow direction. The paper feed portions 1*a* to 1*d* includes cassettes for containing paper sheets in different size, rollers for feeding paper sheets one by one from these paper feed cassettes, and a timing roller 8 for feeding paper sheets to the surface of the transfer belt 5 at specified timing.

When single-sided copy of a paper sheet is performed, the paper sheet is transported by the transfer belt 5 through the fixing device 2 and discharged to the sorter 3. When double-sided copy of a paper sheet is performed, the paper sheet is transported by the transfer belt 5 through the fixing device 2 and again returned to the timing roller 8 for image forming of the back side of the paper sheet.

In a full-color image forming apparatus configured as described above, when a paper sheet guided by a paper feed transportation guide reaches the transfer roller 10, the transfer belt 5 is shifted in an arrow direction, accompanied by which a cyan-colored visible image is formed on the photoconductive drum 6 of the image forming portion PC, a magenta-colored visible image is formed on the photoconductive drum 6 of the image forming portion PM, a yellow-colored visible image is formed on the photoconductive drum 6 of the image forming portion PY, and a black-colored visible image is formed on the photoconductive drum 6 of the image forming portion PK, respectively. These visible images are overlaid in sequence and transferred to the surface of the transfer belt 5 by the transfer charger, by which a color image is superimposed and sent to the transfer roller 10. The visible image reached the transfer roller 10 is overplayed on the paper sheet and transported to the fixing device 2. After the multiply-superimposed image is fixed on the paper sheet in the fixing device 2, the paper sheet is discharged to the sorter 3, or in the case of double-sided copy, the paper sheet is transported to the inversional rotation route 9 and image forming of the back side of the paper sheet is performed in the same procedure as that in single-sided copy stated above. Thus, one copying cycle is ended.

Figure 2:
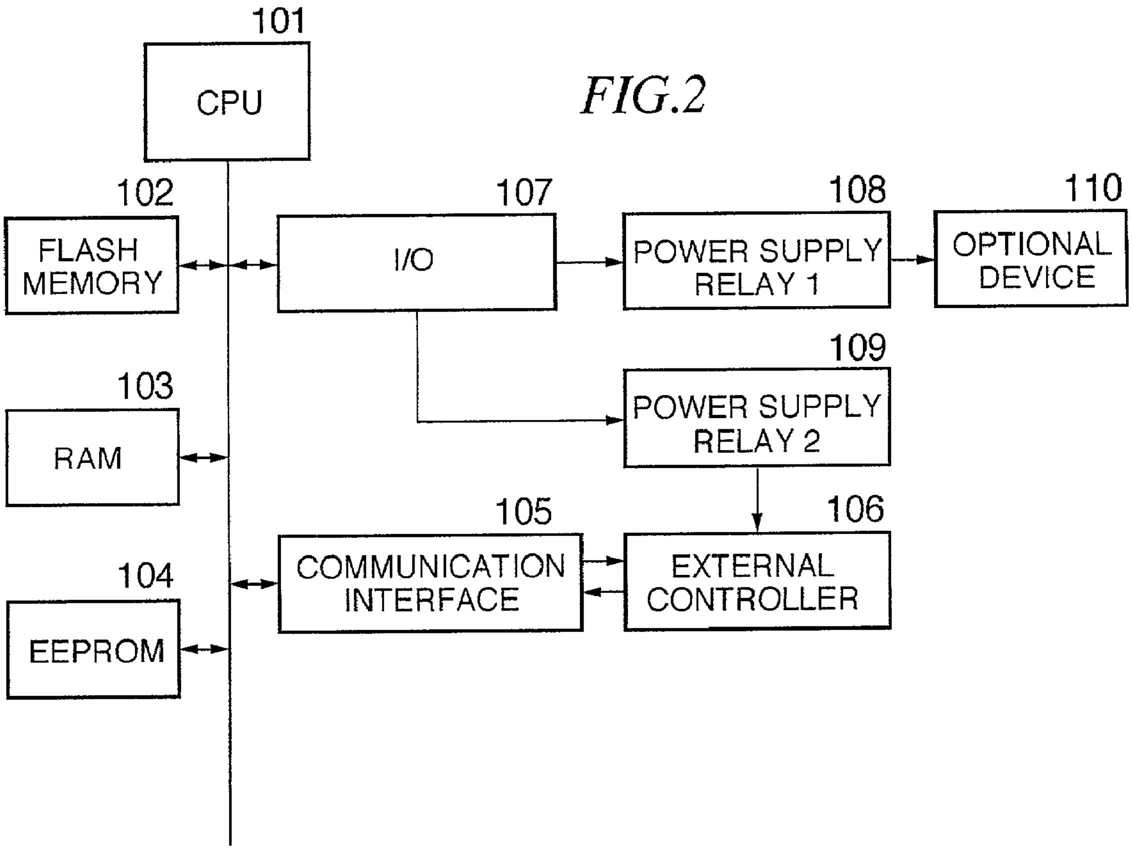
FIG. 2 is a block diagram showing the control configuration of the apparatus.

Description will now be given to control configuration to the present apparatus with reference to FIG. 2. A CPU 101 reads control programs in sequential order from an electrically rewritable flash memory 102 (first storage device) storing control procedures (control programs), and executes control on the image forming apparatus. A RAM 103 serves as a working storage area. An EEPROM 104 (second storage device) is a backup memory to store the state of transfer of the control programs from the outside. Control programs transferred from the outside are written onto the flash memory 102. By the control of the CPU 101, a communication interface 105 (interface device) performs serial communication with an external controller 106 (part of an external device) serving as a driver or an external interface to transfer control programs from the external device (not illustrated) connected to the external controller 106.

The CPU 101 controls a power supply relay (1) 108 and a power supply relay (2) 109 (power supply device) which control power ON/OFF of the loads via an I/O interface 107. An optional device (including the sorter 3 in the paper discharge portion as well as the loads such as various motors) 110 is subject to ON/OFF control of power fed from the power supply by the power supply relay (1) 108 as well as control by the CPU 101. By the control of the CPU 101, the power supply relay (2) 109 switches ON/OFF the power fed to the external controller 106. The I/O interface 107 and the EEPROM 104 can accept configurations utilizing gate arrays (G/A) in addition to the configuration with direct control by the CPU 101.

<Main Flow>

Figure 3:
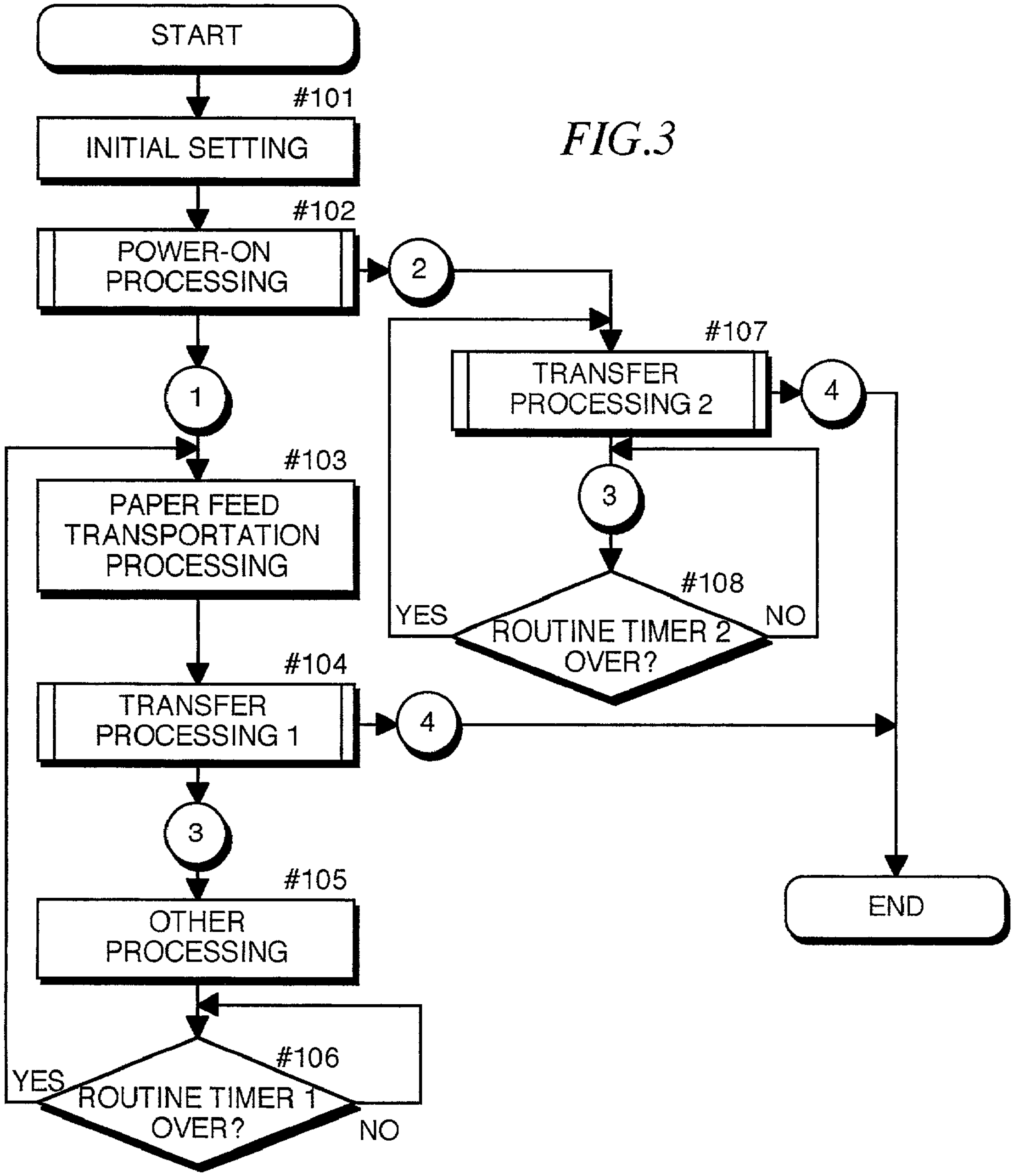
FIG. 3 is a flow chart showing the overall operation of the apparatus.

Description will now be given to the operation in the above-stated control configuration with reference to the main flow shown in FIG. 3. Upon start of the operation of the CPU 101, specified initialization processing is executed. The initialization processing includes initial setting of the CPU 101, as well as initialization and initial setting of various memories and I/O interface (#101). Each processing is executed once every specified time. In the next power-on processing (#102), controls such as readout of the transfer state stored in the EEPROM 104 (details are described later) are performed. In the paper feed transportation processing (#103), processing relating to paper sheets transportation is performed. In the transfer processing (1) and (2) (#104 and #107), processing of program transfer is performed (#104 and #105 are identical. Details are described later). In the other processing (#105), processing of the image forming apparatus is performed such as processing relating to communication with other CPUs, processing relating to abnormal detection, input/output processing to/from I/O interface ports, control on image forming process, and control on transfer belt drive.

A routine timer (1) (#106) is a timer for executing a series of processing from the paper feed processing to the other processing at specified timing. Each processing is executed once every overflow of the timer. A routine timer (2) (#108) is a timer for executing the transfer processing (2) at specified timing. The transfer processing (2) is executed once every overflow of the timer.

<Power-ON Processing>

Figure 4:
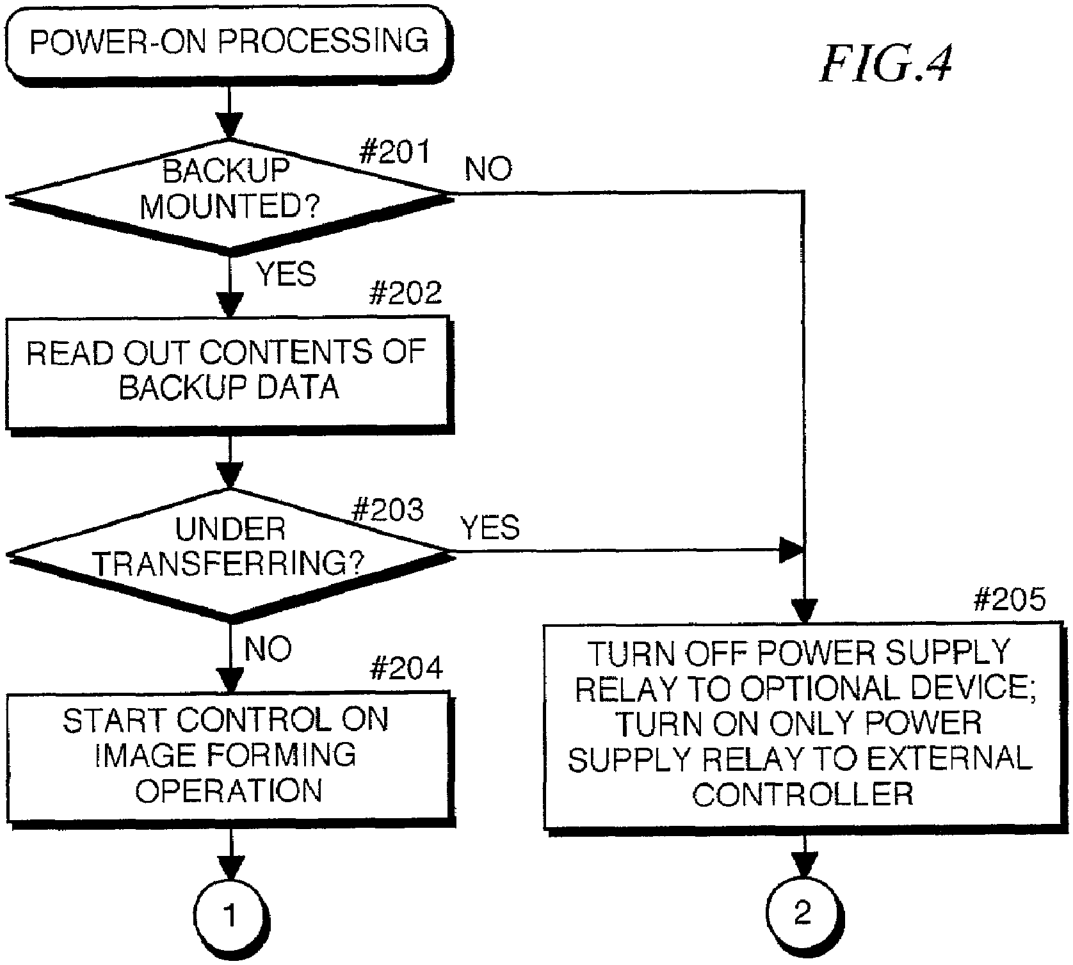
FIG. 4 is a flow chart showing a power-on processing of the apparatus.

Description will now be given to the above power-on processing (#102) with reference to FIG. 4. When power is applied, the CPU 101 executes initial setting including register setting inside the CPU and clear of the RAM 103, and thereafter confirms if the EEPROM 104 for backup operation is mounted or not (#201). As one confirmation method, a given value (e.g. AAAAh (hexadecimal)) is written onto a specified address, and if the readout data indicates AAAAh, it is determined that the EEPROM 104 is mounted. If it is determined that the EEPROM 104 is mounted, contents of the backup data or the program transfer states stored in the EEPROM 104 are read out (#202). If the transfer state reads AAAAh, it indicates that transfer is normally terminated (not under proceeding)(NO in #203), so that power supply to the external controller 106 and an optional device 116 is turned on and normal control on image forming operation is started (#204). Then the procedure goes to 1 in FIG. 3 and the paper feed transportation processing (#103) is executed, while at the same time, the procedure goes to the transfer processing (1) (#104) in the state that the program transfer processing is acceptable.

In the case where the confirmation result in the above stated #201 is NO and in the case where the transfer state is not AAAAh according to the determination in #202, program transfer is considered not to be normally terminated but to be under proceeding (YES in #203). Consequently, the CPU 101 turns off the power supply relay (1) 108 to thereby turn off the loads of the optional device 110 such as a motor and turns on only the power supply relay (2) 109 connected to the external controller 106 (#205). Accordingly, the procedure goes to [2] in FIG. 3 and further proceeds to the transfer processing (2) (#107) in the state that a new program transfer request (erase command) is acceptable.

<Transfer Processing>

Figure 5:
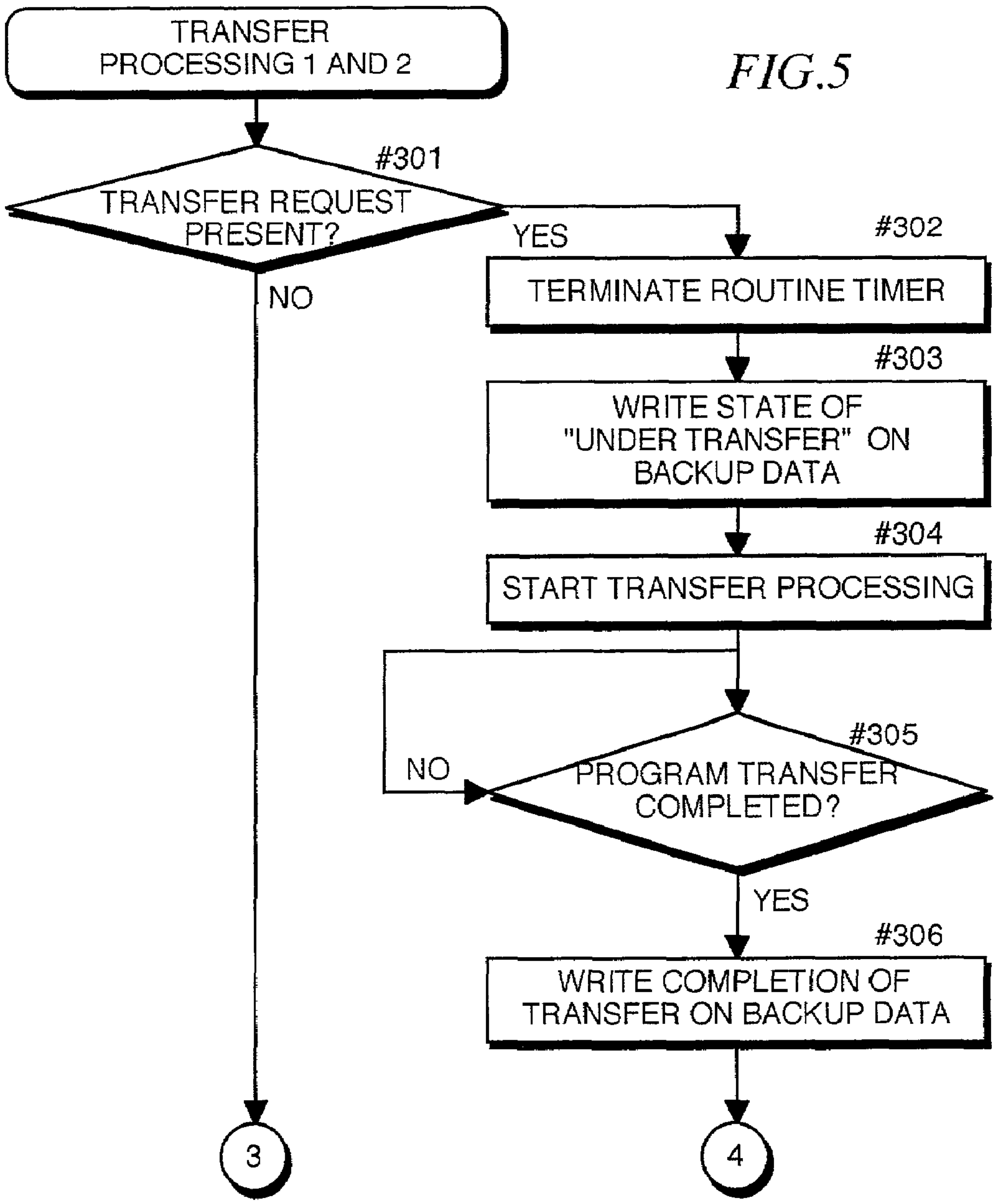
FIG. 5 is a flow chart showing a transfer processing of the apparatus.

Description will now be given to the transfer processing (1) and (2) (#104 and #107) with reference to FIG. 5. In normal conditions, the CPU 101 controls the image forming operation. However, upon reception of a flash memory erase command (transfer request) through serial communication from the external controller 106 (YES in #301), the CPU starts transfer processing. In the transfer processing, the CPU 101 first terminates the routine timer (#302). Then, though not illustrated in the flow shown in FIG. 5, the same processing as the above #205 is executed; the CPU 101 turns off the power supply relay (1) 108 to thereby terminate power supply to the optional device 110 including the loads such as a motor and turns on the power supply relay (2) 109 to thereby activate power supply to the external controller 106 only. After that, the CPU 101 writes FFFFh (not limited thereto) indicating the state of program transfer onto a specified address in the EEPROM 104 (#303).

When the write access is completed, erase of the flash memory 102 is performed and transfer processing is started (#304). Upon completion of the transfer(#305), the check sum of the programs in the flash memory 102 is calculated and reported to the external controller 106. Based on the check sum received and the check sum of the programs to be transferred, the external controller 106 determines if the transfer is normally terminated. If normally terminated, a normal termination command is sent to the CPU 101. If abnormally terminated, an abnormal termination command is sent to the CPU 101. Upon reception of the normal termination command, the CPU 101 writes AAAAh (not limited thereto) indicating the state of program transfer onto a specified address in the EEPROM 104 (#306). Upon reception of the abnormal termination command, no write access is performed. After termination of the program transfer processing (1) and (2), the procedure goes to [4] in FIG. 3 and then ends. Thereafter, unless power is turned off by users, the apparatus is in the state that no processing is executed. It is noted that if no transfer request is made in #301, the procedure goes to [3] in FIG. 1.

Accordingly, at power-on, if program transfer is under proceeding judging from the backup data in the EEPROM 104, power supply to the optional device 110 is turned off to avoid abnormal operation, while on the contrary, power fed from the power supply to the external controller 106 is turned on to continue program transfer.

Not limited to the above processing, it is also possible that the CPU 101 calculates the check sum after the completion of the program transfer in the state that the check sum is embedded in the program to be transferred, and judges whether the calculation result is normal or not as compared with the embedded check sum; the CPU 101 writes AAAAh (not limited thereto) in a specified address in EEPROM if the result is normal.

It is understood that the invention is not limited to the embodiment above disclosed, but is capable of numerous modifications. For example, although power supply to the optional device 110 is turned off to avoid abnormal operation during program transfer in the above embodiment, it is possible to implement equal control on an arbitrary load such as ADF for transporting original paper sheets. In addition, when the EEPROM 104 for backup operation is not mounted, it is also possible to turn off power supply to both of the external controller 106 and the optional device 110.

According to the image processing apparatus of the present invention as described above, control programs are transferred from the external device via the external controller to the first storage device, while the transfer state thereof is stored in the second storage device, and corresponding to the state of the second storage device, power supply to the external controller and optional device for image forming is controlled. This makes it possible to avoid abnormal operation of the optional device during transfer of control programs, which implements increased operational reliability.

What is claimed is:

1. An image processing apparatus, comprising:
- a first storage medium for storing a control program;
- a control device for controlling image processing of the image processing apparatus by the control program stored in the first storage medium;
- a transfer device for transferring the control program from an external device to the first storage medium;
- a nonvolatile second storage medium for storing a transfer state of the control program, the transfer state indicating whether or not the control program is being transferred;
- an optional paper discharge device;
- a power supply control device for controlling power supply to the optional device in response to the transfer state stored in the second storage medium; and
- a write device for writing data that indicates transfer is proceeding onto the second storage medium when transfer of the control program is started, and writing data that indicates transfer is not proceeding onto the second storage medium when transfer of the control program is normally completed.

2. The image processing apparatus as defined in claim 1, further comprising:
- a confirmation device for confirming the transfer state stored in the second storage medium when power is applied to the image processing apparatus.

3. The image processing apparatus as defined in claim 2, wherein power supply to the optional device is stopped when it is confirmed by the confirmation device that the data indicating that transfer is processing is stored in the second storage medium.

4. The image processing apparatus as defined in claim 1, further comprising:

a confirmation device for confirming presence of the second storage medium when power is applied to the image processing apparatus.

5. The image processing apparatus as defined in claim 4, wherein power supply to the optional device is stopped when it is confirmed by the confirmation device that the second storage medium is not present.

6. An image forming apparatus, comprising:

a main body for forming images on paper sheets;

an optional paper discharge device;

a first storage medium for storing a control program;

a control device for controlling image formation of the image forming apparatus by the control program stored in the first storage medium;

a transfer device for transferring the control program from an external device to the first storage medium;

a nonvolatile second storage medium for storing a transfer state of the control program, the transfer state indicating whether or not the control program is being transferred;

a power supply control device for controlling power supply to the optional device in response to the transfer state stored in the second storage medium; and a write device for writing data that indicates transfer is proceeding onto the second storage medium when transfer of the control program is started, and writing data that indicates transfer is not proceeding onto the second storage medium when transfer of the control program is normally completed.

7. The image forming apparatus as defined in claim 6, further comprising:

a confirmation device for confirming the transfer state stored in the second storage medium when power is applied to the image forming apparatus.

8. The image forming apparatus as defined in claim 7, wherein power supply to the optional device is stopped when it is confirmed by the confirmation device that the data indicating that transfer is processing is stored in the second storage medium.

9. The image forming apparatus as defined in claim 6, further comprising:

a confirmation device for confirming presence of the second storage medium when power is applied to the image forming apparatus.

10. The image forming apparatus as defined in claim 9, wherein power supply to the optional device is stopped when it is confirmed by the confirmation device that the second storage medium is not present.

11. An image processing apparatus, comprising:

a first storage medium for storing a control program;

a control device for controlling image processing of the image processing apparatus by the control program stored in the first storage medium;

a transfer device for transferring the control program from an external device to the first storage medium;

a nonvolatile second storage medium for storing a transfer state of the control program, the transfer state indicating whether or not the control program is being transferred;

an ADF;

a power supply control device for controlling power supply to the ADF in response to the transfer state stored in the second storage medium; and a write device for writing data that indicates transfer is proceeding onto the second storage medium when transfer of the control program is started, and writing data that indicates transfer is not proceeding onto the second storage medium when transfer of the control program is normally completed.

12. An image forming apparatus, comprising:

a main body for forming images on paper sheets;

an ADF;

a first storage medium for storing a control program;

a control device for controlling image formation of the image forming apparatus by the control program stored in the first storage medium;

a transfer device for transferring the control program from an external device to the first storage medium;

a nonvolatile second storage medium for storing a transfer state of the control program, the transfer state indicating whether or not the control program is being transferred;

a power supply control device for controlling power supply to the ADF in response to the transfer state stored in the second storage medium; and a write device for writing data that indicates transfer is proceeding onto the second storage medium when transfer of the control program is started, and writing data that indicates transfer is not proceeding onto the second storage medium when transfer of the control program is normally completed.

* * * * *